United States Patent [19]

Kass

[11] Patent Number: 5,566,324
[45] Date of Patent: Oct. 15, 1996

[54] COMPUTER APPARATUS INCLUDING A MAIN MEMORY PREFETCH CACHE AND METHOD OF OPERATION THEREOF

[75] Inventor: William J. Kass, Easley, S.C.

[73] Assignee: NCR Corporation, Dayton, Ohio

[21] Appl. No.: 996,533

[22] Filed: Dec. 24, 1992

[51] Int. Cl.⁶ ................................................. G06F 12/08
[52] U.S. Cl. ................... 395/487; 395/375; 395/421.03; 395/464; 395/414; 395/449
[58] Field of Search ........................... 395/425, 400, 395/375, 464, 414, 449, 375, 421.03, 487, 403; 371/40.2; 364/DIG. 1

[56] References Cited

U.S. PATENT DOCUMENTS

| | | | |
|---|---|---|---|
| 4,214,303 | 7/1980 | Joyce et al. | 395/425 |
| 4,317,168 | 2/1982 | Messina et al. | 395/425 |
| 4,371,927 | 2/1983 | Wilhite et al. | 395/250 |
| 4,439,828 | 3/1984 | Martin | 395/375 |
| 4,439,829 | 3/1984 | Tsiang | 395/425 |
| 4,481,573 | 11/1984 | Fukunaga et al. | 395/400 |
| 4,488,222 | 12/1984 | Cochcroft, Jr. et al. | 395/575 |
| 4,490,782 | 12/1984 | Dixon et al. | 395/425 |
| 4,583,165 | 4/1986 | Rosenfield | 395/421.03 |
| 4,603,380 | 7/1986 | Easton et al. | 395/425 |
| 4,631,660 | 12/1986 | Woffinden et al. | 395/400 |
| 4,669,043 | 5/1987 | Kaplinsky | 395/400 |
| 4,791,642 | 12/1988 | Taylor et al. | 371/40.2 |
| 4,847,758 | 7/1989 | Olson et al. | 395/425 |
| 4,916,605 | 4/1990 | Beardsley et al. | 395/425 |
| 4,918,587 | 4/1990 | Pechter et al. | 395/400 |
| 4,933,837 | 6/1990 | Freidin | 395/375 |
| 4,943,908 | 7/1990 | Emma et al. | 395/375 |
| 4,972,316 | 11/1990 | Dixon et al. | 395/425 |
| 4,996,641 | 2/1991 | Talgam et al. | 395/425 |
| 5,247,642 | 9/1993 | Kadlec et al. | 395/425 |
| 5,283,880 | 2/1994 | Marcias-Garza | 395/425 |
| 5,381,539 | 1/1995 | Yanai et al. | 395/460 |
| 5,420,994 | 5/1995 | King et al. | 395/471 |

FOREIGN PATENT DOCUMENTS

| | | |
|---|---|---|
| 0293720 | 12/1988 | Italy . |
| 4188208 | 7/1992 | Japan . |
| 6-028180 | 2/1994 | Japan . |

OTHER PUBLICATIONS

IBM Technical Disclosure Bullentin, vol. 31, No. 3, Aug. 1988, New York pp. 303–306, "High Performance Microprocessor Memory System".

Gregory, Caching designs eliminate wait states to relieve bottlenecks, Computer Design, v27, n19, p65(5).

Primary Examiner—Matthew M. Kim
Attorney, Agent, or Firm—James H. Beusse

[57] ABSTRACT

A computer system is provided including a main memory prefetch cache which enhances the retrieval of instructions (code and data) stored in the main memory of a computer. The computer system includes a processor and a processor cache coupled thereto. A memory controller is coupled to the processor and includes a main memory prefetch cache. The memory controller also includes control circuitry which determines if a current line requested by the processor is stored in the prefetch cache, and if so, the memory controller retrieves the current line from the prefetch cache and provides the current line to the processor. The next line is then retrieved from the main memory and is overwritten over the current line in the prefetch cache. Otherwise, if the memory controller determines that the prefetch cache does not contain the current line requested by the processor, then the current line is retrieved from the main memory and is provided to the processor. The next line is then retrieved from the main memory and is stored in the prefetch cache at a register location which was occupied by the least recently used line in the cache. The invention includes circuitry and methodology for determining the least recently used line stored within the prefetch cache.

39 Claims, 6 Drawing Sheets

COMPUTER APPARATUS INCLUDING A MAIN MEMORY PREFETCH CACHE AND METHOD OF OPERATION THEREOF

CROSS REFERENCE TO RELATED APPLICATIONS

"Computer Memory System", U.S. patent application Ser. No. 07/563,216, filed Aug. 6, 1990, invented by Edward C. King and F. Vincentinus Vermeer.

"Computer Memory Open Page Bias Method and System", U.S. patent application Ser. No. 07/563,221, filed Aug. 6, 1990, invented by Edward C. King and F. Vincentinus Vermeer.

"Computer Memory System", U.S. patent application Ser. No. 08/132,421, filed Oct. 6, 1993, which is a continuation of U.S. patent application Ser. No. 07/563,214, filed Aug. 6, 1990, invented by Edward C. King, Forrest O. Arnold, Jackson L. Ellis, Robert B. Moussavi, Pirmin L. Weisser and F. Vincentinus Vermeer.

"Data Prefetch Method and System", U.S. Pat. No. 6,530,941, invented by Pirmin L. Weisser, F. Vincentinus Vermeer and Edward C. King.

"Method for Merging Data in A Computer Memory System", U.S. Pat. No. 5,420,994, invented by Edward C. King, Forrest O. Arnold, Jackson L. Ellis, Robert B. Moussavi, Pirmin L. Weisser and F. Vincentinus Vermeer.

"Computer Memory System and Method for Cleaning Data Elements", U.S. Pat. No. 5,287,512, invented by Jackson L. Ellis.

"Mapped Cache Structure and Method", U.S. Pat. No. 5,434,990, filed Aug. 6, 1990, invented by Robert B. Moussavi and Jackson L. Ellis.

"Computer Memory System and Method for Enhancing Performance on Cache Overflows", U.S. patent application Ser. No. 08/609,957, filed Mar. 4, 1996, which is a continuation of U.S. patent application Ser. No. 08/415,789, filed Apr. 3, 1995, now abandoned, which is a continuation of U.S. patent application Ser. No. 07/563,220, filed Aug. 6, 1990, now abandoned, invented by Jackson L. Ellis, Robert B. Moussavi and Edward C. King.

BACKGROUND OF THE INVENTION

This invention relates in general to digital computers and, more particularly, to cache memories for such computers.

Modern computers typically include one or more processors for performing the calculations and logical operations generally associated with such machines. Instructions which are to be executed by the processor are stored in a main memory. When a program is run or executed on a computer, its instructions are called out of the main memory and sent to the processor where they are executed. This process takes valuable time.

It is known that providing a processor cache memory for use by such processors is one way to effectively accelerate the pace at which instructions are executed by the processor. Such a cache memory is a relatively small memory when compared with the size of the main memory. However, this cache memory exhibits a much faster access time than the access time associated with the main memory. The cache memory thus provides relatively quick access to instructions and data which are the most frequently used.

For example, in a typical personal computer application, the main memory may consist of 1–64 Mbytes or more of relatively slow (80 nsec access time) dynamic random access memory (DRAM). However, the cache memory associated with a microprocessor may consist of typically 8 Kbytes to 256 Kbytes or more of fast (20 nsec access time) static random access memory (SRAM). Computers are not designed with a main memory consisting entirely of fast SRAM because SRAM is extremely expensive when compared with DRAM. When instructions and data are called up from the main memory by the microprocessor for execution, they are also stored in the relatively small high speed cache. Thus, the microprocessor has ready access to the most recently executed instructions and data should these instructions and data be needed again by the microprocessor. When the microprocessor needs to use an instruction or data a second time, rather than initiating a relatively slow memory cycle to the slow main memory to retrieve that information, instead the microprocessor quickly accesses the information from the high speed processor cache.

Some microprocessors such as the Intel 80386 are designed to use a local processor cache closely coupled to the local bus of the 80386 microprocessor by a cache controller such as the Intel 82385 cache controller. Other microprocessors such as the Intel 80486 employ a small 8K cache integrated within the microprocessor chip itself. Still other microprocessors such as the Motorola 68040 include dual caches within the microprocessor, one cache being used for code caching and the other cache being used for data caching. For simplicity, both lines of code and lines of data will be referred to as instructions.

Clearly, it is important to keep track of precisely which lines of code and data are stored in the cache. One technique is to use a cache which includes TAGs to help identify a request for an instruction or data which is presently located within the cache. The cache includes memory locations for storing TAG addresses which correspond to addresses of the particular information presently stored in the cache. The microprocessor generates a request for an instruction or data in the form of an address. This information is stored in main memory but might also be stored in the cache due to recent prior use. The TAGs are used to determine if the address generated by the microprocessor is one for which the cache contains the needed information. To accomplish this, the address generated by the microprocessor is compared to the TAG addresses. If the address generated in the request from the microprocessor matches a TAG address, then the cache contains the requested information, a TAG hit occurs, and the microprocessor obtains the requested information directly from the local processor cache. However, if the address generated by the microprocessor fails to match any TAG address, then a TAG miss occurs. In this case, the requested information is not contained in the local processor cache and a memory cycle to the main memory must be generated to obtain the requested information therefrom. The memory cycle takes valuable time.

As the microprocessor processes instructions and data over time, the contents of the cache change. The most frequently used address may also change. For this reason, the situation arises where the cache may be full of information which is recently used and valid; however, that information may not correspond to the information which is being frequently used.

To address this problem, least recently used (LRU) logic has been created to help keep the information in the cache current as well as being valid. To do this, LRU logic keeps track of those cache address locations which are least recently used. When a cache miss occurs (no TAG address match was found), a main memory access results. The main memory then provides the requested information to the microprocessor at which time the cache also stores this information and the corresponding TAG address at one of the TAG locations in the cache. The LRU logic determines which particular TAG location in the cache should be overwritten with the most recent address requested and which resulted from the cache miss. The TAG location where the replacement occurs is the TAG location which the LRU logic determined contained the least recently used TAG address.

At one extreme, a cache may have fixed addresses. In the case where the cache addresses are so fixed, there is no necessity for keeping track of which TAG address is least frequently used. The information itself which corresponds to the fixed TAG address is the only thing which can be updated. In this situation, testing to determine whether or not a cache hit occurs for a particular TAG address is straightforward because the TAG addresses are hard-wired. At the other end of the spectrum is a cache arrangement wherein any TAG location can have any address generated by the microprocessor. In this situation, the determination of a TAG address hit requires reading all of the TAG addresses stored in the cache and testing each TAG address to see if a match occurs between the stored TAG address and the particular address requested by the microprocessor. The latter type of cache is referred to as a "fully associative cache".

It is helpful at this point to briefly review how microprocessors execute instructions stored in main memory. In a computing system, the processor obtains its instructions from a sequence of instruction words which are located in main memory. The sequence of instructions are placed in memory in an orderly fashion one after another at respective sequential addresses. The sequence of instructions is executed by the processor in a serial mode, taking one instruction after another in address order, until either a branch instruction jumps to a new section of code stored elsewhere in main memory or until a "call" or "interrupt" instruction temporarily jumps to a new section of code. Later process flow continues back to the point in the code from which the call or interrupt occurred and execution of subsequent instructions continues.

When a branch or call is executed, processing must stop until the new instructions are fetched from memory. Any time spent by the microprocessor waiting during this time period is critical to the effective execution speed of the microprocessor. Modern microprocessors include a memory prefetch for the next line of code. In this manner, the instruction buffer of the microprocessor is kept full. However, this does not reduce the system overhead time spent accessing main memory during branch and call return instructions, namely, the problem discussed earlier. Unfortunately, increasing the prefetch line size can overload the data bus and cause delays for other work.

More specifically, the instruction queue for the microprocessor can be viewed as a pipe. As the pipe starts to become empty, the microprocessor performs a code pre-fetch to the next sequential code execution address in main memory to refill the pipe. When a branch instruction is encountered, an out of sequence memory access is requested as the place from which to start filling the pipe. The microprocessor's prefetch ability is mainly used to prevent stalls during which the microprocessor would have to wait in the idle state until new code is available.

A code/data cache between the main memory and the microprocessor as in the processor cache discussed above helps ameliorate the problems discussed above to some degree. However, difficulty still exists in filling the processor cache quickly enough with new code and code returns without overloading the bus by gathering many extra code sequences that will not be used.

SUMMARY OF THE INVENTION

Accordingly, one object of the present invention is to provide a computer system with a cache memory which enhances effective microprocessor execution speed with respect to branch and code return instructions.

Another object of the present invention is to provide a computer system with a cache memory which is integrated in the memory controller of the main memory to enhance performance.

Yet another object of the present invention is to provide a computer system with a cache memory which implements prefetching without contributing to system overhead.

Still another object of the present invention is to provide a computer system with a main memory prefetch cache which is capable of determining the least recently used line contained in such prefetch cache and purging the same.

Yet another object of the present invention is to provide a main memory prefetch cache which enhances the performance of multi-processor computer systems as well as uni-processor computer systems.

In accordance with one embodiment of the present invention, a computer system is provided which includes a processor and a processor cache coupled to the processor. The computer system also includes a memory controller coupled to the processor and a main memory coupled to the memory controller. The memory controller includes a main memory prefetch cache and a cache control circuit. The cache control circuit is coupled to the prefetch cache and is used for determining if a cache hit has occurred wherein the current line requested by the processor is stored in the prefetch cache. If so, then the control circuit causes the retrieving of the current line from the prefetch cache for use by the processor and further causes the overwriting of the current line in the prefetch memory with the next line from the main memory. Otherwise when the prefetch cache does not contain the current line requested by the processor thus signifying a cache miss, then the control circuit causes the retrieving of the current line from the main memory for use by the processor and the retrieving of the next line from the main memory and the storing of the next line in the prefetch cache.

The prefetch cache employed in the computer system includes x prefetch cache registers for storing instructions prefetched from the main memory, wherein x is a number. The computer system further includes x least recently used (LRU) counters, each LRU counter corresponding to a respective one of the prefetch cache registers, each counter containing a count value indicating how recently the contents of the corresponding prefetch cache register have been used. The system also includes a clearing circuit for clearing a count value designated HIT COUNT in an LRU counter corresponding to a prefetch cache register in which a cache hit has occurred. A first incrementing circuit is coupled to the LRU counters for incrementing all LRU counters whose count value is less than the HIT COUNT value when a cache hit occurs, the count value of the remaining LRU counters remaining unchanged when a cache hit occurs. The system further includes a purging circuit, coupled to the prefetch cache, for purging the prefetch cache of the least recently used line when a cache miss occurs by writing the next line to the particular cache register corresponding to the LRU counter exhibiting a maximum count value. The system also includes a second incrementing circuit, coupled to the LRU counters, for incrementing those LRU counters other than the LRU counter corresponding to the particular cache register into which the next line is written when a cache miss occurs.

In accordance with another embodiment of the computer system of the invention, the computer system includes a processor and a processor cache memory which is accessible to the processor. The computer system also includes a main memory for storing a sequence of instructions for execution by the processor. The system further includes a memory controller, coupled to the processor and the main memory, for controlling access by the processor to the instructions stored in the main memory. The memory controller includes a main memory prefetch cache for storing instructions prefetched from the main memory prior to a request therefor from the processor. The memory controller further includes a cache control circuit, coupled to the prefetch cache, for determining if a current instruction N requested by the processor is contained in the prefetch cache and, if so, retrieving the current instruction N from the prefetch cache and providing the current instruction N to the processor and retrieving the next instruction N+1 from the main memory and overwriting the current instruction N with the next instruction N+1. Otherwise, when the prefetch cache does not contain the current instruction N requested by the processor, then the cache control circuit initiates the act of retrieving the current instruction N from the main memory and providing the current instruction N to the processor and retrieving the next instruction N+1 from the main memory and storing the next instruction N+1 in the prefetch cache memory.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

I. MAIN MEMORY PREFETCH CACHE HARDWARE AND LEAST RECENTLY USED (LRU) LINE SELECTION HARDWARE

Figure 1:
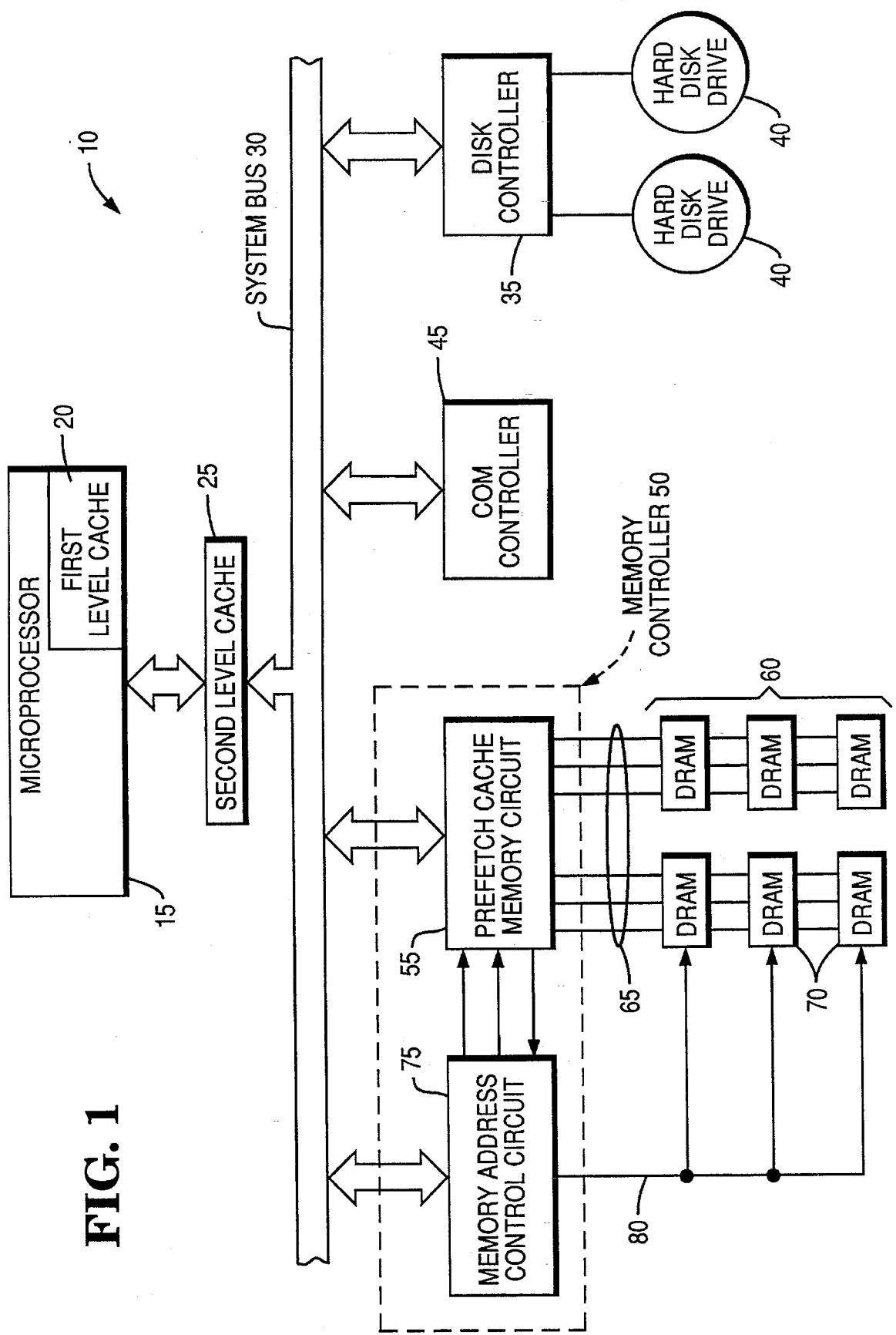
FIG. 1 is a block diagram of a computer system employing a main memory prefetch cache in accordance with the present invention.

A computer system in accordance with the present invention is depicted in FIG. 1 as system 10. System 10 includes a microprocessor 15 which, in one embodiment, includes an cache 20 integrated in the chip on which microprocessor 15 is fabricated. For example, an INTEL 80486 which includes an 8K internal cache is suitable for use as microprocessor 15. In this configuration, cache 20 is referred to as a "first level" cache.

In this particular embodiment, computer system 10 includes another cache memory 25 which is externally coupled to microprocessor 15 as shown. Cache memory 25 is a "second level" cache memory that works in conjunction with first level cache memory 20 to supplement cache memory 20. First level cache memory 20 is relatively small in comparison with the size of second level cache memory 25. Second level cache memory 25 is an external cache which exhibits a size typically within the range of 32K–512K bytes or larger of high speed, static read only memory (SRAM).

The invention can be also be practiced with a microprocessor 15 which has only an internal cache without an external, second level cache such as cache memory 25. Alternatively, the invention can be practiced with a microprocessor which does not have an integrated cache such as cache 20, provided an external processor cache memory such as cache memory 25 is used in conjunction with the microprocessor. It should be understood that first level cache memory 20 and second level cache memory 25 are both "processor" cache memories in that they are both local to processor 15.

Second level cache memory 25 is coupled to a system bus 30 to enable microprocessor 15 to communicate with other components of computer system 10. For example, a disk controller 35 is coupled to system bus 30 to interface one or more hard disk drives 40 to computer system 10. A communication controller card 45 is coupled to system bus 30 to provide system 10 with serial and parallel ports.

A memory controller 50 is coupled to system bus 30 as shown. Memory controller 50 includes a prefetch cache memory circuit 55 which is coupled to a main memory 60 via data lines 65. Main memory 60 includes a plurality of memory elements 70, for example dynamic random access memory (DRAM) surface in-line memory modules (SIMMs) or the like. The access time associated with the memory contained in prefetch cache memory circuit 55 is significantly faster than that of memory elements 70.

Memory controller 50 also includes a memory address control circuit 75 for controlling requests for access to main memory 60 from microprocessor 15. Memory address control circuit 75 is coupled to system bus 30 and prefetch cache memory circuit 55. Memory address control circuit 75 is also coupled to main memory 60 by address, row address strobe (BAS), column address strobe (CAS), read enable and write enable lines which are shown collectively as lines 80 in FIG. 1.

Figure 2:
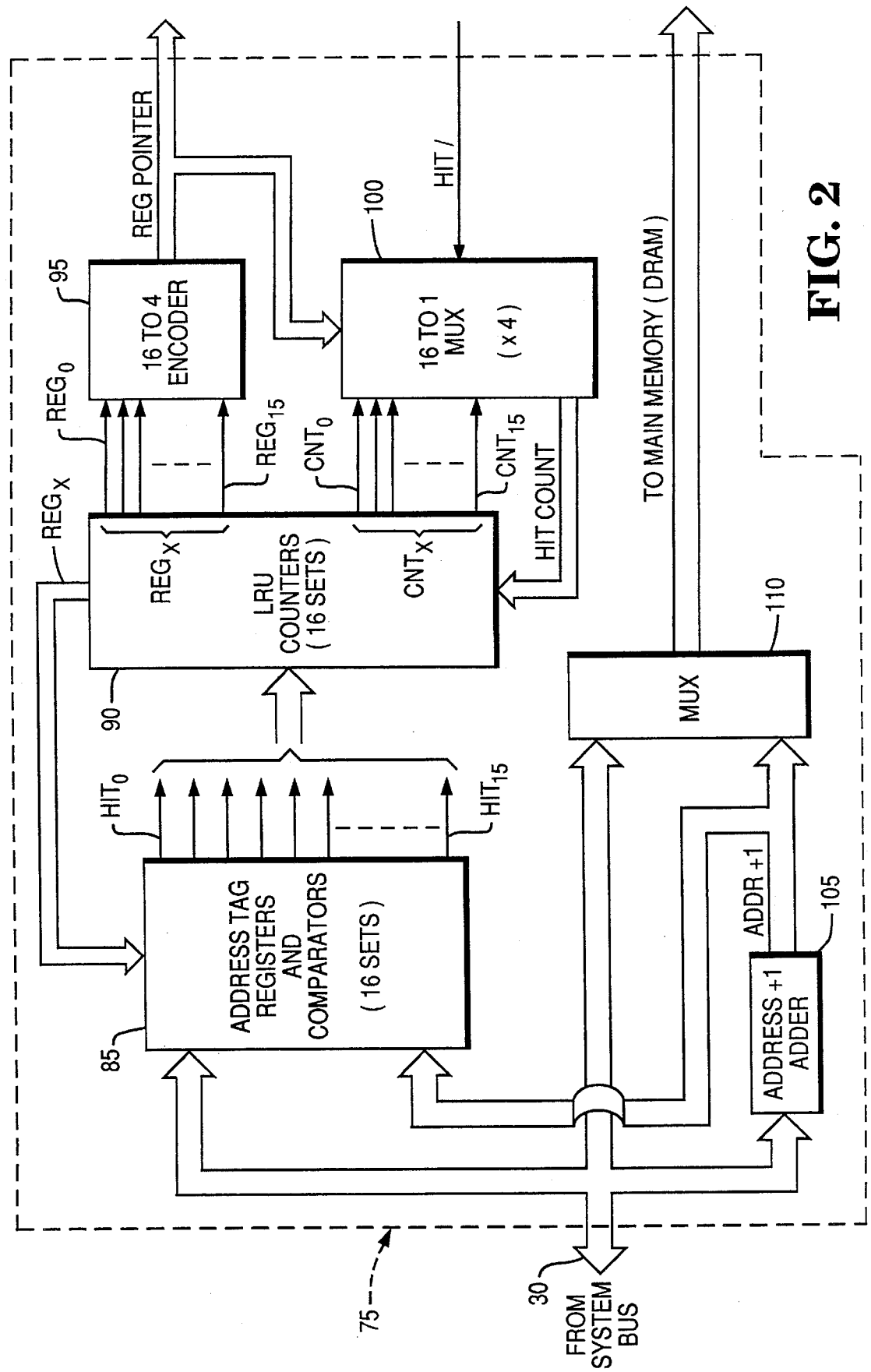
FIG. 2 is a block diagram of the memory address control circuit portion of the memory controller in the computer system of FIG. 1.

FIG. 2 shows a more detailed block diagram of the memory address control circuit 75 portion of memory controller 50. Memory address control circuit 75 includes an address tag register and comparator block 85 having 16 sets of address tag registers and comparators, This constitutes one address tag register and comparator combination per each of the 16 registers in prefetch cache 198 (see FIG. 3), as discussed later. Memory address control circuit 75 is coupled to system bus 30 as shown to receive address requests therefrom. The tag registers in register/comparator block 85 are used to store the addresses of the instructions which are currently stored in prefetch cache memory circuit 55. The comparators in register/comparator block 85 are used to determine if there is a match (a hit) between a requested address and an address currently stored in prefetch memory 55. Register/comparator block 85 includes two groups of 16 outputs, namely $HIT_0$ through $HIT_{15}$ and $HIT+1_0$ through $HIT+1_{15}$. When a request is made to memory controller 50 for an instruction at a particular address, one of outputs $HIT_0$ through $HIT_{15}$ corresponding to the register location of that address in the prefetch cache goes true if there is a cache hit. The operation and configuration of register/comparator block 85 will be discussed in more detail later.

Memory address control circuit 75 further includes least recently used (LRU) counter block 90 which contains a set of 16 LRU counters. The LRU counters act to assure that the most often used instructions are contained in prefetch cache memory 55. In other words, the least recently used instruction is selected for replacement when prefetch cache 55 is full. A respective LRU counter is thus provided for each of the address tag registers in address tag register/comparator block 85. More particularly, the first LRU counter in LRU counter block 90 corresponds to and is coupled to the first address tag register/comparator in block 85 via hit output line HIT0, and the second LRU counter in LRU counter block 90 corresponds to and is coupled to the second address tag register/comparator in block 85 via hit output line $HIT_1$, and so forth.

LRU counter block 90 includes 16 REGx outputs, designated $REG_0$, $REG_1$, ... $REG_{15}$, which are coupled to a 16 to 4 encoder 95 and back to address tag register/comparator block 85. Encoder 95 converts the 1 of 16 lines into a 4 bit REG POINTER value signal at its output. LRU counter block 90 also includes 16 $CNT_x$ outputs, designated $CNT_0$, $CNT_1$, ... $CNT_{15}$, which are coupled to a 16 to 1 multiplexer 100 such that a HIT COUNT signal is generated at the output thereof. The HIT COUNT signal is fed back to LRU counter block 90. A /HIT signal is supplied to multiplexer 100. The nature and function of the $REG_x$, $CNT_x$, HIT COUNT and /HIT signals will be discussed in a later example.

Memory address control circuit 75 also incorporates an address+1 adder 105 which is coupled to system bus 30. Address+1 adder 105 takes an address request received from system bus 30 and advances that address to the next sequential address in main memory. Adder 105 includes an ADDRESS+1 output which is coupled to register/comparator block 85 and to a multiplexer 110 as shown in FIG. 2. System bus 30 is also coupled to an input of multiplexer 110. The output of multiplexer 110 is coupled to main memory 70 such that either the requested current address or the current address plus 1 can be passed to and accessed from main memory 70.

Figure 3:
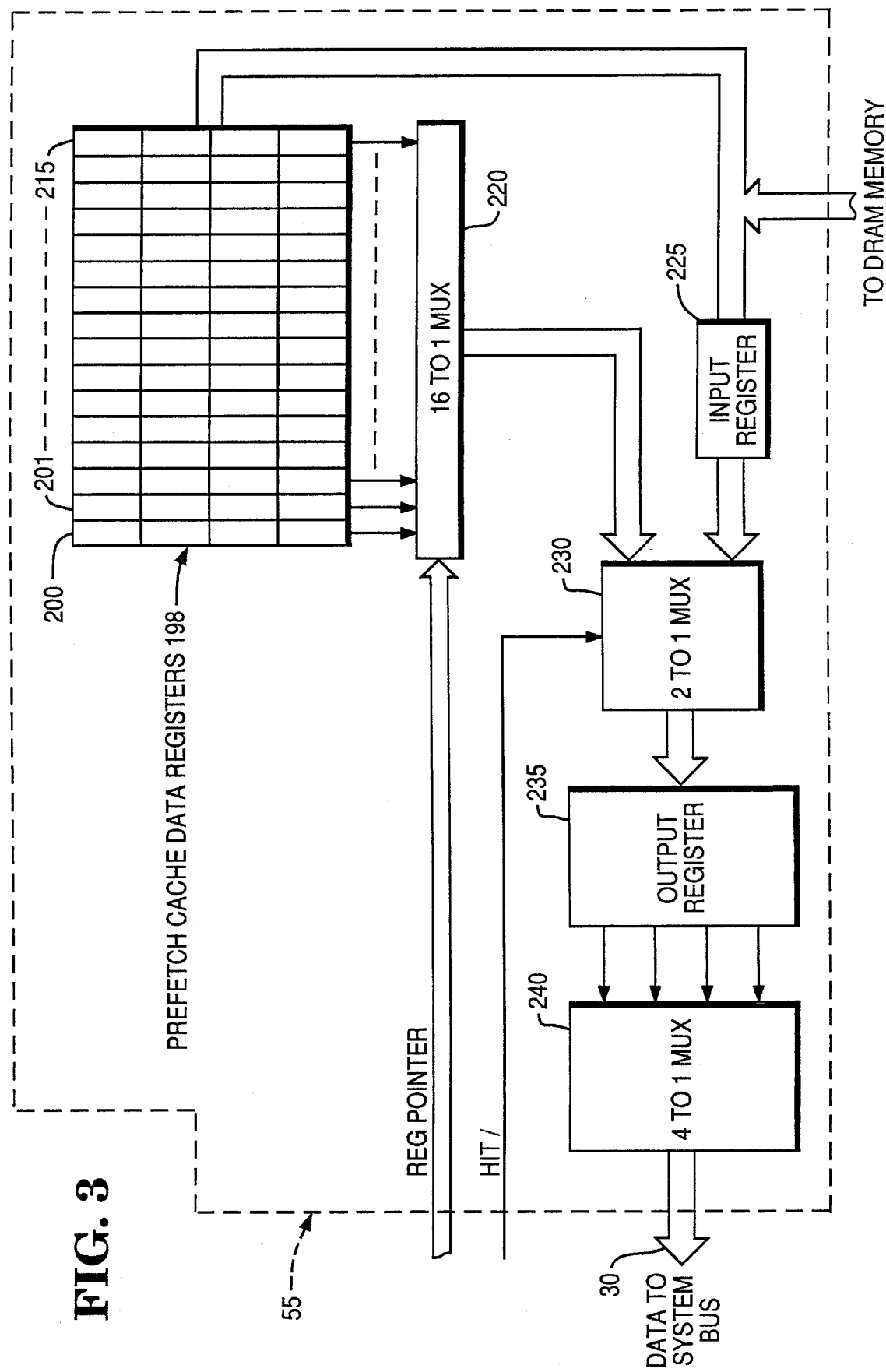
FIG. 3 is a block diagram of the prefetch cache memory circuit portion of the computer system of FIG. 1.

FIG. 3 is a block diagram of prefetch cache memory circuit 55 including read path of main memory controller 50. Prefetch circuit 55 includes a prefetch cache memory 198 having 16 sets of cache registers designated as register sets 200, 201, ... 215. Prefetch cache memory 198 is coupled to main memory 60 such that memory 198 can store instructions (code and data) retrieved from main memory 60. The output of each of cache register sets 200–215 is coupled to a respective input of a 16 to 1 multiplexer 220. The REG POINTER output of memory address control circuit 50 of FIG. 2 is coupled to multiplexer 220 as shown in FIG. 3 to select a particular cache register from which data is to be obtained.

Main memory 60 is also coupled via an input register 225 to an input of a 2 to 1 multiplexer 230. The output of 16 to 1 multiplexer 220 is coupled to another input of 2 to 1 multiplexer 230 as shown in FIG. 3. Multiplexer 230 includes an output which is coupled via an output register 235 to a 4 to 1 multiplexer 240. Multiplexer 230 also includes a /HIT input to select whether data for the processor comes from main memory or from the data cache. The output of 4 to 1 multiplexer 240 is coupled to system bus 30 such that lines or instructions (code and data) at requested addresses can be provided to microprocessor 15 at the bus width needed by microprocessor 15.

Figure 4:
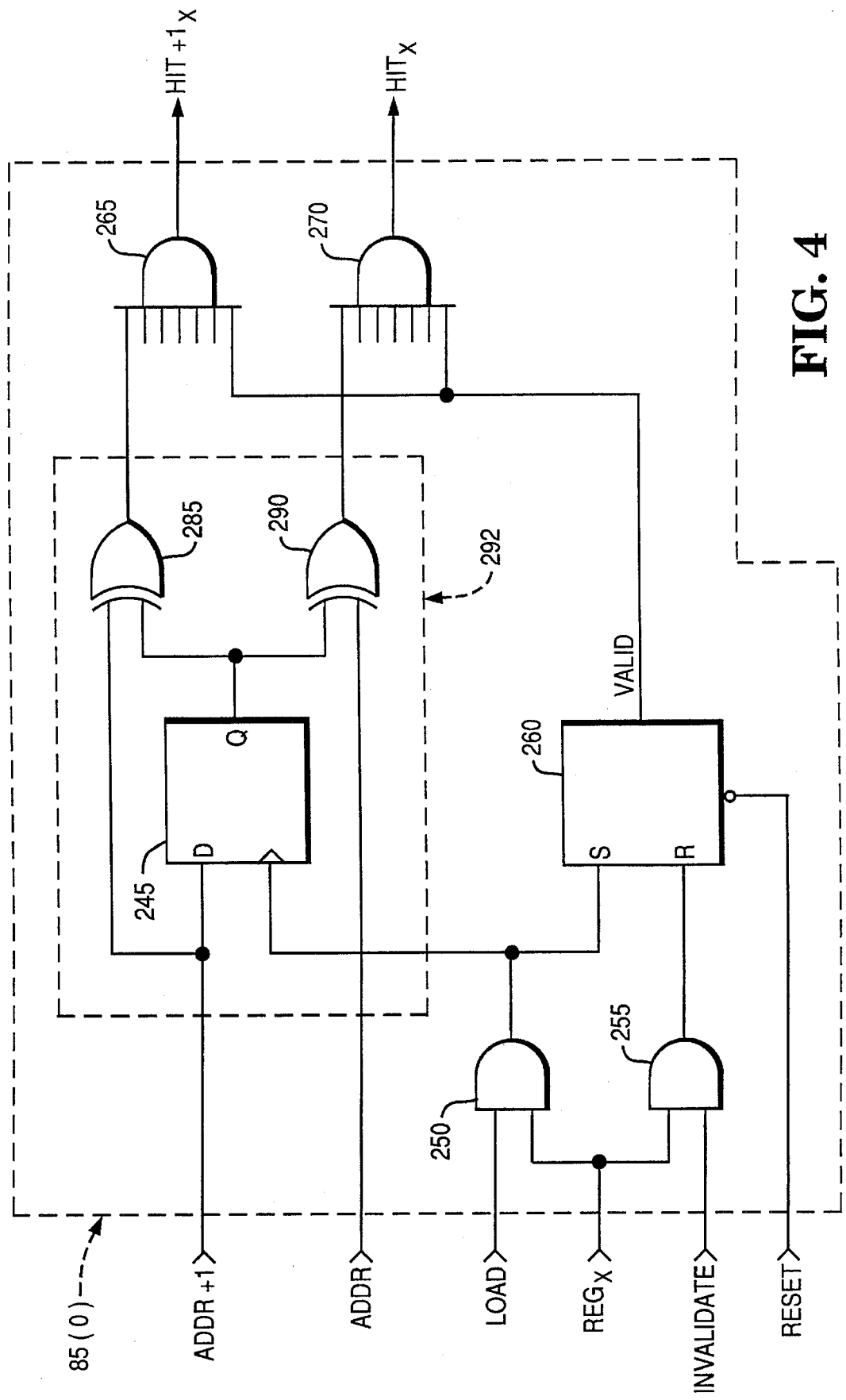
FIG. 4 is a detailed schematic diagram of one of the 16 tag registers employed in the memory address control circuit portion of FIG. 2.

A detailed schematic diagram of one of the 16 tag registers 85 used in memory address control circuit 75 is shown in FIG. 4 as tag register circuit 85(0). The sample tag register 85(0) includes ADDR+1, LOAD, ADDR, $REG_x$, INVALIDATE and RESET inputs. The function of the ADDR signal received from system bus 30 is to communicate to memory controller 50 the particular address corresponding to an instruction which microprocessor 15 wants to retrieve from main memory 60. The ADDR+1 input of tag register 85(0) is coupled to the ADDR+1 output of ADDRESS+1 adder 105. It will be recalled that whereas ADDR is the address which microprocessor is currently attempting to retrieve from main memory 60, ADDR+1 is the next sequential address in main memory 60 following address ADDR. In other words, ADDR+1 is the address of the next sequential line or instruction following ADDR. The ADDR+1 comparator is needed to prevent loading a second ADDR+1 line into the cache if a first ADDR+1 line is already present therein.

The ADDR+1 input of tag register 85(0) is coupled to the D input of a D flip flop 245 as shown in FIG. 4. The LOAD input of tag register 85(0) is coupled to one input of a two input AND gate 250, the remaining input of which is coupled to the $REG_x$ input and one input of another two input AND gate 255. The derivation of the $REG_x$ signal on the $REG_x$ input will be discussed later. The INVALIDATE line is coupled to the remaining input of AND gate 255. The INVALIDATE pulse is used to clear the "VALID" bit of a cache line if processor 15 is writing to main memory and the main memory location was previously stored in the cache. The output of AND gate 250 is coupled to the clock input of D flip flop 245 and to the S input of an RS flip flop 260. The output of AND gate 255 is coupled to the R input of RS flip flop 260.

The output of RS flip flop 260 is designated as the VALID output and is coupled to one input of multi-input AND gate 265 and to one input of multi-input AND gate 270. The ADDR+1 input of tag register 85(0) is coupled to one input of two input EX OR gate 285, the remaining input of which is coupled to the Q output of D flip flop 245 and to one input of a two input EX OR gate 290. The remaining input of EX OR gate 290 is coupled to the ADDR input of tag register 85(0).

Flip flop 245 and EX OR gates 285 and 290 form a block 292 which is repeated in tag address register/comparator block 85(0) as many times as there are address bits in main memory 60. For example, wherein computer system 10 is a 32 bit system, block 292 is repeated 32 times, namely, once per each bit of the address. The outputs of EX OR gates 285 and 290 in such repeated blocks 292 are coupled to respective inputs on AND gates 265 and 270. To reflect this connection, AND gates 265 and 270 are illustrated with multiple inputs in FIG. 4 although to conserve space the specific connection of each of such multiple inputs is not shown.

Accordingly, a $HIT_x$ signal is generated at the output of AND gate 270 and a $HIT+1_x$ signal is generated at the output of AND gate 265. If the $HIT_x$ signal is true, this indicates that a match to the current processor access request can be supplied from the prefetch cache at register location x therein. It will be recalled that the 16 data registers of prefetch cache 198 are labelled 200–215 which corresponds to values of x from 0–15. In other words, if $HIT_3$ goes true, there is a hit in prefetch register 203, and so forth. If the $HIT_x+1$ signal is true, then the next sequential memory line is already in the prefetch cache and it is not necessary to do a memory prefetch for this line.

Figure 5:
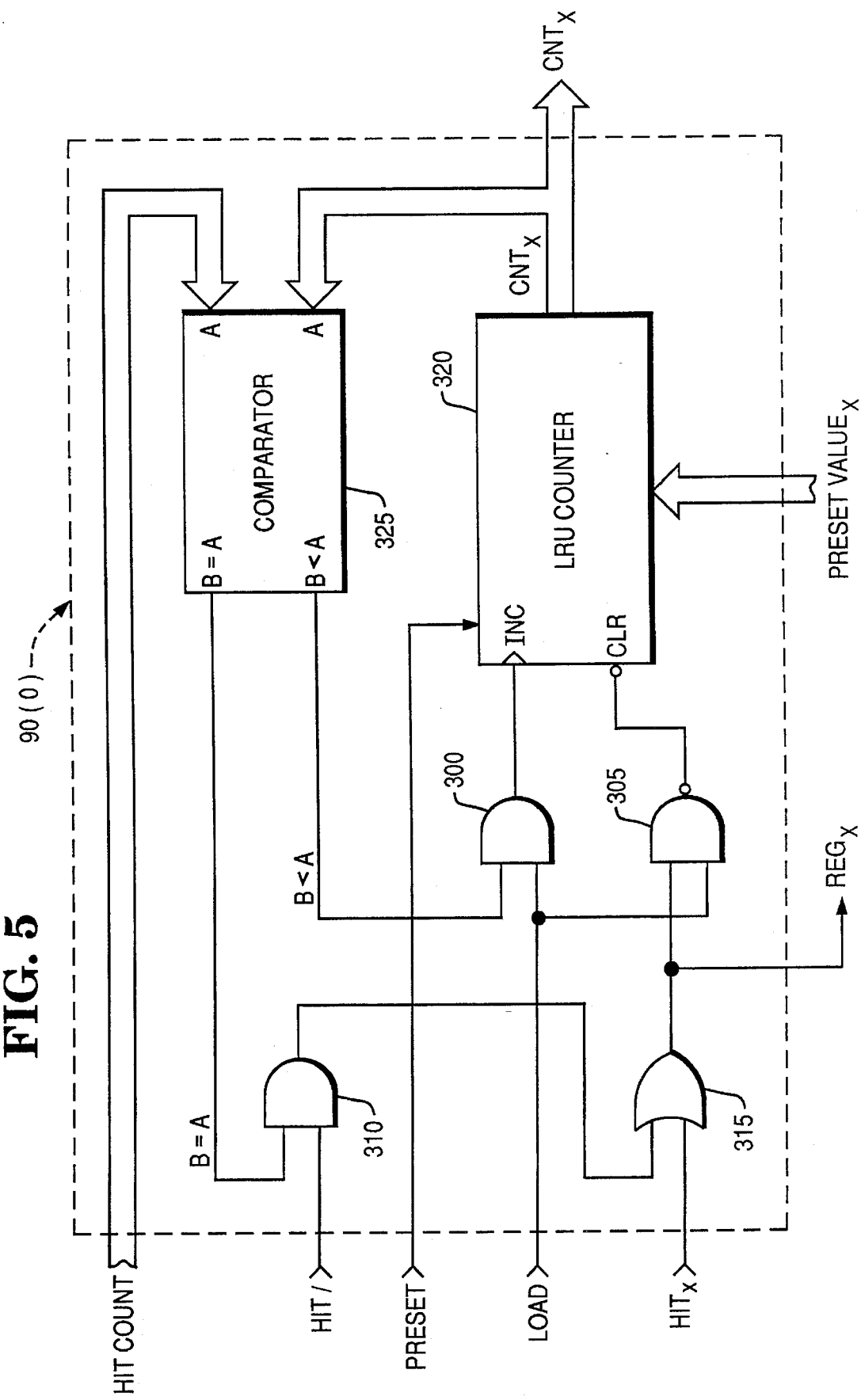
FIG. 5 is a detailed schematic diagram of one of the 16 least recently used (LRU) counters employed in the memory address control circuit portion of FIG. 2.

One of the 16 least recently used (LRU) counters employed in the memory address control circuit 75 is shown in FIG. 5 as LRU counter 90(0). LRU counter 90(0) includes inputs HIT COUNT, /HIT, PRESET, PRESET VALUE$_x$, LOAD and HIT$_x$ to which HIT COUNT, /HIT, PRESET, PRESET VALUE$_x$, LOAD and HIT$_x$ signals are respectively provided.

The LOAD input of LRU counter 90(0) is coupled to one input of a two input AND gate 300 and to one input of a two input NAND gate 305. The /HIT input of LRU counter 90(0) is coupled to one input of a two input AND gate 310, the output of which is coupled to one input of a two input OR gate 315. The remaining input of OR gate 315 is coupled to the HIT$_x$ input. The output of OR gate 315 is coupled to the remaining input of NAND gate 305 and forms the REG$_x$ output of LRU counter 90(0) at which the REG$_x$ output signal is generated.

The output of AND gate 300 is coupled to the INC input of a counter 320. The output of NAND gate 305 is coupled to an inverting clear input CLR of counter 320. The PRESET and PRESET VALUE$_x$ signals are provided to counter 320 as shown in FIG. 5. The PRESET VALUE$_x$ signal provides 16 different initial count values to the 16 respective LRU counters 320 at a time indicated by the PRESET command signal. The output of counter 320 is designated CNT$_x$ and is coupled to the B input of a comparator 325 having inputs A and B. The HIT COUNT input value is provided to the remaining A input of comparator 325 as shown. Comparator 325 checks to see if the CNT$_x$ value is equal to the HIT COUNT value and if so the B=A output of comparator 235 goes true. Comparator 325 also checks to see if the CNTx value is greater than the HIT COUNT value and if so the B<A output of comparator 235 goes true. The B=A output of comparator 325 is coupled to the remaining input of AND gate 310. The B<A output of comparator 325 is coupled to the remaining input of AND gate 300.

LRU counter block 90 operates in the following manner. The LRU mechanism employed in counter block 90 consists of a 4 bit LRU counter 320 associated with each of the 16 cache tag entry/lines. Thus in this particular embodiment, counter 320 has 16 possible count values, namely 0,1,2, . . . 15. If a cache hit on line x occurs, then line x's counter will be cleared and all counters for lines having a count value lower than x's previous count value are incremented by 1 when the LOAD pulse occurs. If a cache miss occurs, then the tag register and cache line corresponding to the counter that has a count value 1111 (or decimal 15) are cleared and used for the new tag/data and all other counters are incremented by 1. Counters 320 do not overflow, but rather are all initialized to an incrementing value from 0000 to 1111.

II. PREFETCH CACHE OPERATIONAL OVERVIEW

A general overview of the operation of the main memory prefetch cache mechanism in computer system 10 is now provided. Main memory prefetch cache 55 may be viewed as assisting a processing unit 15 which already has a processor cache such as internal cache 20 and/or external cache 25.

It is helpful at this point to consider the operation of computer system 10 from the time of start-up or initialization. Upon system startup, the contents of external cache 25 and/or internal cache 20 are all invalid, because they essentially have no contents. The contents of prefetch cache 55 are likewise invalid for the same reason. Each of these caches have invalid bits associated with them so that it can be determined whether or not a particular location in the respective caches contain valid instructions. In the present discussion, the term "line" includes instructions, whether they be code or data. A line may include a block of information such as an 8 or 16 byte block, for example. Such lines are stored in main memory in sequential address order, one after the other.

When microprocessor 15 attempts to access a current line (a first instruction which is either code or data) it sees that the contents of all caches are invalid and therefore an access directly to main memory 60 (DRAM) is made. Memory controller 50 locates the current line in main memory 60 and sends the current line to output register 235 where it is later transferred to microprocessor 15 for processing. The current line is stored in one or both of internal cache 20 and external cache 25, and the current line+1 is prefetched and stored in prefetch cache 55. The current line+1 is defined as the instruction stored at the next sequential instruction address in main memory 60 after the current instruction. More particularly, the current line+1 is accessed and stored in prefetch memory simultaneously with the transfer of the current line to the processor so as not to contribute to system overhead.

The microprocessor then proceeds to the next line (next instruction) in the particular program that it is executing, this new line now being designated as the new current line. Microprocessor 15 sends a request for the new current line to memory controller 50, such request consisting of the address of the new current line. Memory controller 50 starts a main memory cycle (DRAM cycle) and simultaneously looks to see if the requested new current line is stored in prefetch cache memory 55. If the new current line is stored in prefetch cache 55 as per a cache hit, it is accessed, sent to microprocessor 15 for processing and the main memory cycle (DRAM cycle) is modified to retrieve the new current line+1. Once retrieved, the new current line+1 is stored in prefetch cache 55. In this manner, the prefetch mechanism employed in prefetch cache 55 stays one step ahead of line requests to memory controller 50 without contributing any extra system bus cycle overhead. In actual practice, when a cache hit occurs. the new current line is retrieved from prefetch cache 55 and temporarily stored in output register 235 for later transfer to microprocessor 15. When the current line+1 comes in from main memory, it is stored back into the same location in the prefetch cache that the current line was in. Because of this, a small set of cache registers can track multiple processing threads.

If the microprocessor's line request to memory controller 50 is the result of a branch instruction in the program which is being executed, then the lookup in prefetch cache memory 55 will fail and a cache miss occurs. In the event of a cache miss, the main memory cycle (DRAM cycle) is not modified, but rather continues. In other words, the address sought in the memory cycle which results from the memory request is not changed and the memory cycle proceeds forward. The instruction (code or data) at the requested address in main memory 60 is obtained and stored in output register 235 for later transfer to microprocessor 15. A DRAM page mode access continues and retrieves the next line after the new current line (ie. the new current line+1). The new current line+1 is then stored in prefetch cache 55 so that prefetch cache 55 is prepared if microprocessor 15 continues executing instructions along the same sequential instruction path. This fetch from main memory 60 is at page mode access speed and is faster than a normal main memory access.

The cache miss scenario described immediately above is in contrast to the cache hit scenario described earlier wherein the new current line corresponding to the requested address was found to be stored in prefetch cache 55. It will be recalled that in the event of such a cache hit, the address sought from main memory in the main memory cycle was modified from the address of the new current line to the address of the new current line+1. The new current line+1 retrieved from main memory is then used to overwrite the new current line which was found to be stored in the prefetch cache.

III. LEAST RECENTLY USED (LRU) LINE SELECTION OPERATIONAL OVERVIEW

The purpose of LRU counters, encoder 95 and multiplexer 100 is to select the particular line in prefetch cache memory 55 which has been least recently used. More particularly, in a cache miss situation, this least recently used line is replaced with new data from the main memory when the cache becomes full.

It is helpful at this point to consider the REG POINTER signal depicted in FIG. 2 at the output of encoder 95. Considering FIG. 2 in conjunction with FIG. 3, the main purpose of the REG POINTER signal is to select from which of prefetch data cache registers 198 that data is going to be obtained. It is also noted that in FIG. 2, the REG POINTER signal is fed back to multiplexer 100 to select which of the 16 $CNT_x$ count values provided to multiplexer 100 gets fed back to LRU counters 90 as HIT COUNT.

A respective LRU counter 320 is provided for each of the 16 lines stored in the 16 prefetch cache registers 200–215 in prefetch memory 55. Each of the LRU counters 320 in LRU counter block 90 maintains a count number, $CNT_x$, which indicates how recently the corresponding line in cache 55 has been accessed or used, wherein x varies from 0 through 15 according to which of the 16 counters or corresponding lines in the prefetch cache memory is being referenced. If in a cache hit situation a particular LRU counter 320 contains a count of 0, then the corresponding register in prefetch memory register block 198 has just had a line of data written to it. This action causes the count value in that LRU counter 320 to be reset to 0 indicating that the corresponding prefetch data register has been most recently used. If in the next memory cycle, no data is needed from that same line or location in that particular register, then the corresponding LRU counter is incremented from a value of 0 to a value of 1. Selected ones of the remaining 15 LRU counters are also incremented by 1 as described later. When the count $CNT_x$ of a particular LRU counter reaches 15, then the data in the prefetch memory location corresponding to that LRU counter is selected for replacement should a cache miss occur.

Returning now momentarily to FIG. 2, it is again noted that a respective address tag register/comparator 85 block is provided for each of prefetch cache data registers 200–215. That is, tag register circuit 85(0) is provided for cache register 200, tag register circuit 85(1) is provided for cache register 201 and tag register 85(15) is provided for cache register 215. When the microprocessor attempts to access a particular main memory location, the memory controller first looks to the prefetch cache to see if the requested instruction is contained in a line stored therein. Block 85 checks to see if there is a cache hit in prefetch cache 55. More particularly, block 85 checks to see if any of the 16 prefetch cache registers 200–215 in prefetch cache 55 contain the requested line, the address of which is provided to each of the 16 ADDR inputs of the 16 blocks 85 (see FIG. 4). This is accomplished by checking the address of the requested line with the addresses stored in the 16 tag registers within block 85. If there is a match, then there is a cache hit. Blocks 85 also conduct a check to determine if the ADDR+1 line is already stored in prefetch cache memory. This is done to make sure that the same line is not stored in the prefetch cache at two different locations.

When a match occurs between the current line requested by microprocessor 15 and a tag address in one of the 16 tag register circuits 85(0) 85(15), then under these cache hit conditions the particular particular HIT output of block 85 corresponding to that tag address goes true (see FIG. 2).

For example purposes, in the subsequent discussion it is assumed that a cache hit has occurred wherein the requested line matches the tag address in the third tag register circuit 85(3). Thus, the $HIT_3$ output of address tag register/comparator block 85 is true. The HIT outputs $HIT_0$, $HIT_1$, $HIT_2$ and $HIT_4$–$HIT_{15}$ are all false in this case. It is arbitrarily assumed that LRU counter 320 in LRU counter circuit 90(3) has a $CNT_3$ count value of 8. It will be recalled that the CNT value indicates how fresh or stale a particular tag address and its line are with respect to the other tag addresses and lines. A CNT value of 0 indicates the freshest or most recently used line and a CNT value of 15 indicates the most stale or least recently used line.

The true $HIT_3$ value is fed to OR gate 315 as seen in the LRU counter of FIG. 5 and appears at the output thereof as $REG_x$ which in this example is $REG_3$. In this case, $REG_3$ is true while all other $REG_x$ values other than $REG_3$ are false. The $REG_3$ value is provided to encoder 95 (FIG. 2) which supplies a value of 3 at its 4 bit REG POINTER output so that the line stored in prefetch cache data register 203 (FIG. 3) of prefetch cache 198 can be selected. (Note the numerical correspondence of the REG POINTER value of 3 and the prefetch data register number 203 which it selects. A REG POINTER value of 4 would be used to select the contents of prefetch register 204, and so forth.)

Returning again to FIG. 2, the REG POINTER value of 3 is also supplied to multiplexer 100 such that the particular count $CNT_3$ (ie. $CNT_x$ wherein x=3) of the LRU counter circuit 90(3) is fed back to LRU counters 90 as HIT COUNT. Thus, in this particular example wherein $CNT_3$ is assumed to have a value of 8, a HIT COUNT value of 8 is fed back to LRU counters 90. It will be recalled that each of the 16 LRU counters is associated with a respective corresponding tag address register and prefetch cache data register. The CNT values in the LRU counter circuits 90 are changed (incremented or cleared) according to the recentness of use of the corresponding data lines in the prefetch cache data registers.

Whenever a cache hit occurs, the LRU counter 90(x) corresponding to the data line for which the hit occurred is set back to 0 indicating that such data line is most recently used. Also when such a cache hit occurs, the current line requested by the microprocessor is moved from the appropriate prefetch cache data register 200 to output register or buffer 235 for subsequent transmittal to the microprocessor. The current line is overwritten with the next line from main memory and the tag register 85(x) corresponding to the overwritten line is updated with the new address information of the next line for prefetch cache content tracking purposes.

The operation of LRU counter circuit 90 is now discussed in more detail with reference to LRU counter circuit 90(0) of FIG. 5. Upon initialization of computer system 10, a different unique $CNT_x$ value from 0 to 15 is stored in the respective LRU counters 320 of counter circuits 90(0), 90(1), . . . 90(15). For purposes of discussion, an LRU counter circuit 90(3) which is identical to LRU counter circuit 90(0)

is now considered. It was earlier noted that LRU counter circuit 90(3) is the LRU counter corresponding to the prefetch cache register 203 for which a cache hit was observed. It was arbitrarily assumed for purposes of example that the $CNT_3$ value in counter 90(3) is 8. Thus a $CNT_3$ value of 8 is provided to the B input of comparator 325. A HIT COUNT value of 8 is also provided to the A input of comparator 325 in this case.

Comparator 325 conducts a comparison test and finds that in the present case A=B and thus the A=B output of comparator 325 goes true. Since A=B, it is known that a hit has occurred. Thus AND gate 310 is blocked and a false appears at the output of AND gate 310. The B<A output of comparator 325 is also false. In this situation, register 320 will not be incremented when a LOAD pulse appears at the LOAD input to AND gate 300.

During the time at which the prefetch cache is being loaded with data from main memory 60, the LOAD pulse is issued. When the LOAD pulse is issued, the values stored in the LRU counters 320 change in the manner now described. In the present example, when the LOAD pulse is issued, it is blocked by AND gate 300 and the output of AND gate 300 is false. However, under these conditions the LOAD pulse drops down and feeds through NAND gate 305 to cause LRU counter 320 to be cleared or reset to a count value of 0. That is, the $CNT_3$ count in LRU counter 320 of counter circuit 90(3) goes from a value of 8 to a value of 0. This indicates that a cache hit has occurred and that the contents of the corresponding prefetch cache data register 203 are "most recently used" or fresh.

As will be seen in the subsequent discussion, the contents of the LRU counters 320 in selected ones of the remaining counter circuits 90(0), 90(1), 90(2) and 90(4) through 90(15) are incremented by one to reflect that their respective contents have become less recently used by a quantity of one. For example purposes, LRU counter 320 in remaining counter circuit 90(0) is now considered in the present case where the cache hit occurred in prefetch data register 203 (to which counter circuit 90(3) corresponds). Since the cache hit occurred in prefetch data register 203 and not in register 200 (which corresponds to counter circuit 90(0)), it is observed that HIT(0) is false, but HIT COUNT is still 8. It is assumed that the count value $CNT_0$ stored in LRU counter 320 in counter circuit 90(0) is a 5, an arbitrary value selected for purposes of this example.

Since HIT COUNT is 8, then A is 8 at comparator 325. Also since $CNT_0$ is 5 in our example, B is 5 at comparator 325. Thus, the B<A output of comparator 325 is true and when the LOAD pulse is issued, the output of AND gate 300 goes true causing counter 320 of counter circuit 90(0) to be incremented by one. The $CNT_0$ count value stored in counter 90(0) thus moves from a value of 5 to a value of 6. Moreover, all of the LRU counters which contain a value less than 8 will be incremented.

However, any LRU counters containing a value greater than HIT COUNT, or 8 in this case, keep the same contents. For example, if the LRU counter 320 in counter circuit 90(7) has a $CNT_7$ value of 9, then A=8 and B=9 at comparator 325. Neither B=A nor B<A are true at comparator 325. Since there is no HIT to turn AND gate 310 on, the contents of LRU counter 320 in counter 90(7) are not cleared or reset to zero on the issuance of the LOAD pulse, but rather remain the same as before, namely a $CNT_7$ value of 9. Similarly, the contents of any other LRU counters which contain a $CNT_x$ value of 9 or more (ie. greater than HIT COUNT) will remain the same.

To summarize the operation of the LRU mechanism in conjunction with the prefetch cache mechanism of the present invention, the case of a cache hit is first considered. In a cache hit, the current line requested by the microprocessor is contained in prefetch cache 55. The current line is retrieved and sent to output register 235 for transfer to the microprocessor. The next line subsequent to the current line is retrieved from main memory and is used to overwrite the current line in the prefetch cache. Moreover, when a cache hit occurs on a line in a particular prefetch data register 200–215, then the particular LRU counter 90(0)–90(15) corresponding to that prefetch data register is cleared (reset to zero) and all remaining LRU counters 90 having a count value less than the count value in that particular counter are incremented by one. The count value in the remaining LRU counters 90 is unchanged when there is a cache hit.

However, if a cache miss occurs, then the current line requested by the microprocessor is not contained within the prefetch cache. In this case, the particular tag register 85 and particular prefetch cache register 200–215 corresponding to the LRU counter 90 whose count value equals the maximum count of 1111 (decimal 15) are selected. When the LOAD pulse occurs, this particular tag register and prefetch cache register are then used to store the new tag address and new data line (current line) from main memory, respectively, and this LRU count is cleared from a count of 15 to zero. All remaining counters 90 are incremented by 1 in the case of a cache miss.

IV. METHODOLOGY—STEP BY STEP PROCESS FLOW

Figure 6:
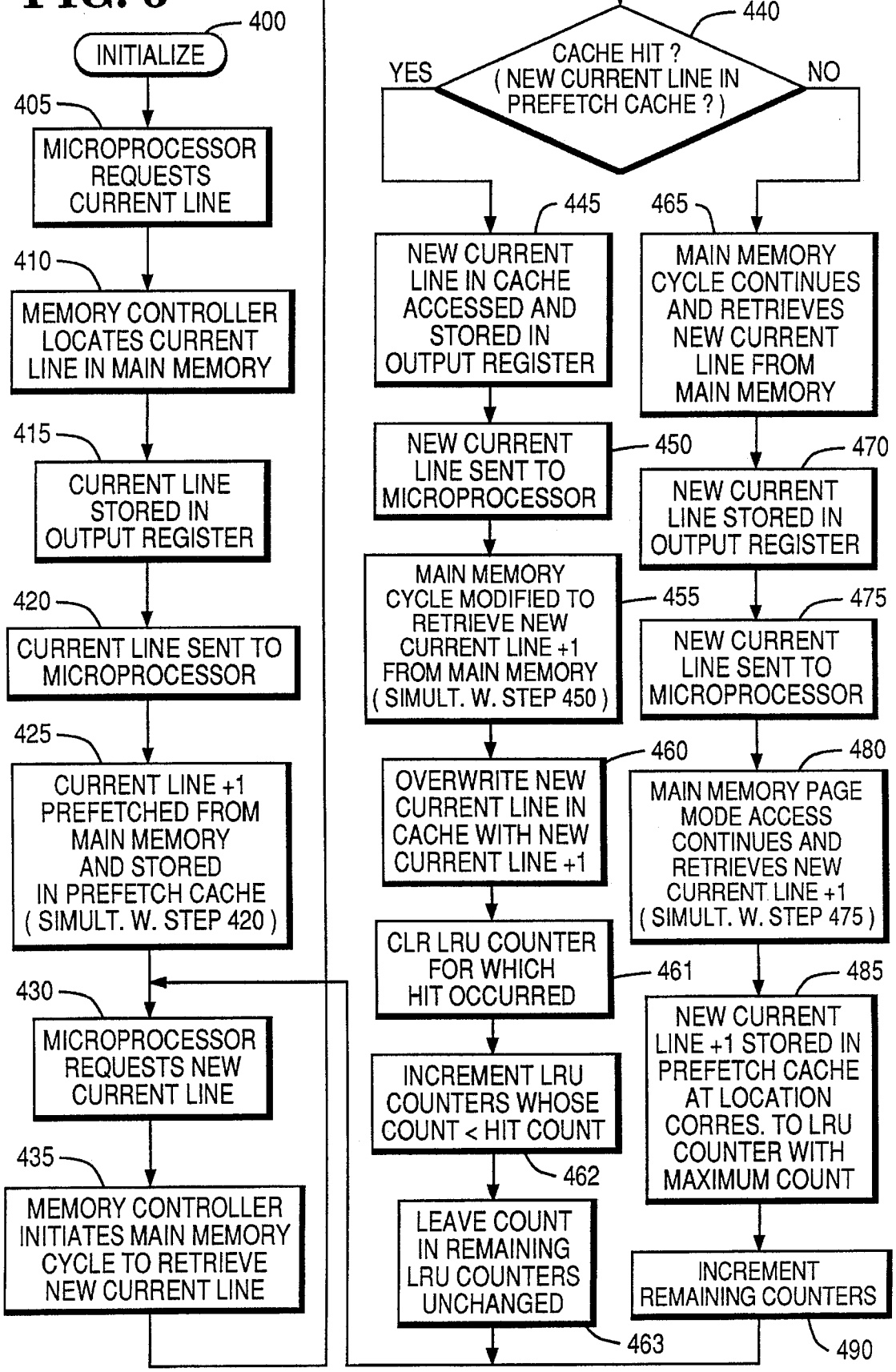
FIG. 6 is a flowchart which shows an overview of the step by step operation of the invention.

A flowchart depicting an overview of the step by step operation of the invention is shown in FIG. 6. Computer system is 10 initialized at block 400 and starts executing instructions at block 405 at which microprocessor 15 requests a current line. Since computer system 10 was just initialized, cache misses occur in the internal cache 20, the external cache 25 and the main memory prefetch cache 55. In that event, memory controller 50 locates the current line in main memory 60 as a result of a main memory cycle as per block 410. The current line is sent from main memory 60 to output register 235 at block 415 and is later transmitted to microprocessor 15 as per block 420. Simultaneously with block 420 wherein the current line is sent to microprocessor 15, the current line+1 is prefetched from main memory 60 and is stored in prefetch cache memory 55 as per block 425.

Microprocessor 15 continues executing its program and then requests a new current line as per block 430. In response, memory controller 50 starts a main memory cycle at block 435 to retrieve the new current line. Memory controller 50 then determines if the new current line is in prefetch cache 55 as per block 440. This determination is made at the beginning of the main memory cycle initiated at block 435.

If it is determined that the new current line is stored in prefetch cache 55, then the new current line in the cache is accessed and stored in output register 235 as per block 445. The new current line is then sent from output register 235 to microprocessor 15 as per block 450. The main memory cycle commenced at block 435 is the modified at block 455 to retrieve the new current line+1 from main memory 60 instead of the new current line. This retrieval of the new current line+1 in block 455 occurs simultaneously with transmission of the new current line to microprocessor 15 at block 450. The new current line+1 which was retrieved from main memory 60 is then stored in prefetch cache 55 by overwriting the current line with the new current line+1 as per block 460.

In block 461, the particular LRU counter 90(x) which corresponds to the particular prefetch cache data register in which the hit occurred is then cleared or reset to zero to indicate that this particular prefetch data register's contents are the most recently used. This particular prefetch data register's contents are the most recently used because the new current line+1 has just overwritten the current line which previously occupied this location. The LRU counters which have a count value less than HIT COUNT are incremented by one as per block 462. The count value in the remaining LRU counters is left unchanged as per block 463.

Flow then continues back to block 430 at which microprocessor 15 executes the next instruction in the program and requests another new current line from memory controller 55.

If however it is determined in decision block 440 that the new current line is not stored in prefetch cache 55 (ie. a cache miss), then the main memory cycle initiated at block 435 is continued at block 465 to retrieve that new current line from main memory 60. Once retrieved, the new current line is stored in output register 235 as per block 470 for later transfer to microprocessor 15 as per block 475. The main memory page mode access continues so as to retrieve the new current line+1 at block 480 simultaneously with the new current line being sent to microprocessor 15 at block 475. The new current line+1 is then stored in prefetch cache 55 at the register location corresponding to the particular LRU counter circuit 90(x) exhibiting a maximum count value as per block 485. The least frequently used line was stored in that register location and is purged by this action. The remaining LRU counter circuits 90 are then incremented by one as per block 490.

Flow then continues back to block 430 at which microprocessor 15 executes the next instruction in the program and requests yet another new current line from memory controller 55.

While the above description sets forth a computer system, it is clear that a method of operating the computer system is also disclosed. More particularly, a method of accessing the main memory of a computer is disclosed which includes the step of providing a main memory prefetch cache situated in a memory controller and coupled to the main memory. The method includes the step of initiating a main memory cycle to retrieve a current line from the main memory. The method further includes the step of determining, by the memory controller, if the current line is stored in the prefetch cache. If the current line is determined to be stored in the prefetch cache, then the method includes retrieving the current line from the prefetch cache and providing the current line to the processor, and retrieving the next line from the main memory and overwriting the current line in the prefetch cache with the next line. If however the current line is determined not to be stored in the prefetch cache, then the method includes retrieving the current line from the main memory and providing the current line to the processor, and retrieving the next line from the main memory and storing the next line in the prefetch cache.

In an implementation of the method wherein the prefetch cache includes X registers (X is a number), the method further includes the steps of providing a respective least recently used (LRU) counter corresponding to each of the registers in the prefetch cache and initializing each of the LRU counters at a unique predetermined count value between 0 and X inclusive. If in the determining step the current line is determined to be stored in the prefetch cache as per a cache hit, then the method includes clearing the count value stored in the particular LRU counter corresponding to the register in the prefetch cache for which the cache hit occurred and further includes incrementing the LRU counters whose count values are less than the count value of the particular LRU counter prior to the clearing step. If in the determining step the current line is determined not to be stored in the prefetch cache as per a cache miss, then the method includes storing the next line in the register in the prefetch cache corresponding to the LRU counter having a maximum count X, and further includes incrementing the remaining counters.

The foregoing has described a computer system including a cache memory which enhances effective microprocessor execution speed with respect to branch and code return instructions. The disclosed computer system employs a prefetch cache memory which is integrated in the memory controller of the main memory to significantly enhance performance. The computer system of the present invention includes a main memory prefetch cache which achieves prefetching without contributing extra system overhead. Moreover, the disclosed main memory prefetch cache can also enhance the performance of multi-processor computer systems.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A computer system comprising:

a processor;

a processor cache coupled to said processor;

a memory controller coupled to said processor;

a main memory coupled to said memory controller;

said memory controller including a main memory prefetch cache, and control means coupled to said prefetch cache for determining if a cache hit has occurred wherein a current line requested by said processor is stored in said prefetch cache, and if so, then retrieving said current line from said prefetch cache for use by said processor and overwriting said current line in said prefetch cache with a next line from said main memory, or otherwise when said prefetch cache does not contain said current line requested by said processor thus signifying a cache miss, then retrieving said current line from said main memory for use by said processor and substantially concurrently retrieving said next line from said main memory and storing said next line in said prefetch cache such that said next line is transferred to said prefetch cache prior to a request for said next line from said processor.

2. The computer system of claim 1 wherein said prefetch cache comprises x prefetch cache registers for storing instructions prefetched from said main memory, wherein x is a number.

3. The computer system of claim 2 further comprising x least recently used (LRU) counters, each LRU counter corresponding to a respective one of said prefetch cache registers, each counter containing a count value indicating how recently and instruction in corresponding prefetch cache register has been used.

4. The computer system of claim 3 further comprising clearing means for clearing a count value designated HIT COUNT in an LRU counter corresponding to a prefetch cache register in which a cache hit has occurred.

5. The computer system of claim 4 further comprising first incrementing means, coupled to said LRU counters, for incrementing all LRU counters whose count value is less than said HIT COUNT value when a cache hit occurs, the count value of the remaining LRU counters remaining unchanged when a cache hit occurs.

6. The computer system of claim 5 further comprising purging means, coupled to said prefetch cache, for purging said prefetch cache of a least recently used line when a cache miss occurs by writing said next line to the particular cache register corresponding to the LRU counter exhibiting a maximum count value.

7. The computer system of claim 6 further comprising second incrementing means, coupled to said LRU counters, for incrementing those LRU counters other than the LRU counter corresponding to said particular cache register into which said next line is written when a cache miss occurs.

8. The computer system of claim 1 wherein said processor cache comprises an internal processor cache integrated in said processor.

9. The computer system of claim 1 wherein said processor cache comprises an external processor cache externally coupled to said processor.

10. The computer system of claim 2 wherein said processor cache further comprises an external processor cache externally coupled to said processor.

11. A computer system comprising:

a processor;

a processor cache coupled to said processor;

a memory controller coupled to said processor;

a main memory coupled to said memory controller;

said memory controller including
   a main memory prefetch cache, and
   control means coupled to said prefetch cache for fetching from said prefetch cache a current line when requested by said processor if a cache hit occurs, and in that case substantially concurrently overwriting said current line in said prefetch cache with a next line sequentially following said current line in said main memory prior to receiving a request from said processor for said next line.

12. The computer system of claim 11 wherein said prefetch cache comprises x prefetch cache registers for storing instructions prefetched from said main memory, wherein x is a number.

13. The computer system of claim 12 further comprising x least recently used (LRU) counters, each LRU counter corresponding to a respective one of said prefetch cache registers, each counter containing a count value indicating how recently and instruction in corresponding prefetch cache register has been used.

14. The computer system of claim 13 further comprising clearing means for clearing a count value designated HIT COUNT in an LRU counter corresponding to a prefetch cache register in which a cache hit has occurred.

15. The computer system of claim 14 further comprising first incrementing means, coupled to said LRU counters, for incrementing all LRU counters whose count value is less than said HIT COUNT value when a cache hit occurs, the count value of the remaining LRU counters remaining unchanged when a cache hit occurs.

16. The computer system of claim 15 further comprising purging means, coupled to said prefetch cache, for purging said prefetch cache of a least recently used line when a cache miss occurs by writing said next line to the particular cache register corresponding to the LRU counter exhibiting a maximum count value.

17. The computer system of claim 16 further comprising second incrementing means, coupled to said LRU counters, for incrementing those LRU counters other than the LRU counter corresponding to said particular cache register into which said next line is written when a cache miss occurs.

18. The computer system of claim 11 wherein said processor cache comprises an internal processor cache integrated in said processor.

19. The computer system of claim 11 wherein said processor cache comprises an external processor cache externally coupled to said processor.

20. The computer system of claim 18 wherein said processor cache further comprises an external processor cache externally coupled to said processor.

21. A computer system comprising:

a processor;

a processor cache memory which is accessible to said processor;

a main memory for storing a sequence of instructions for execution by said processor;

a memory controller, coupled to said processor and said main memory, for controlling access by said processor to the instructions stored in said main memory, said memory controller including
   a main memory prefetch cache for storing instructions prefetched from said main memory prior to a request therefor from said processor, and
cache control means, coupled to said prefetch cache, for determining if a current instruction N requested by said processor is contained in said prefetch cache and, if so, retrieving said current instruction N from said prefetch cache and providing said current instruction N to said processor and retrieving a next instruction N+1 from said main memory and overwriting said current instruction N with said next instruction N+1, or otherwise when said prefetch cache does not contain a current instruction N requested by said processor, then retrieving said current instruction N from said main memory and providing said current instruction N to said processor and substantially concurrently retrieving a next instruction N+1 from said main memory and storing said next instruction N+1 in said prefetch cache memory prior to receiving a request for said next instruction from said processor.

22. The computer system of claim 21 wherein said prefetch cache comprises x prefetch cache registers for storing instructions prefetched from said main memory, wherein x is a number.

23. The computer system of claim 22 further comprising x least recently used (LRU) counters, each LRU counter corresponding to a respective one of said prefetch cache registers, each counter containing a count value indicating how recently an instruction in the corresponding prefetch cache register has been used.

24. The computer system of claim 23 further comprising clearing means for clearing a count value designated HIT COUNT in an LRU counter corresponding to a prefetch cache register in which a cache hit has occurred.

25. The computer system of claim 24 further comprising first incrementing means, coupled to said LRU counters, for incrementing all LRU counters whose count value is less than said HIT COUNT value when a cache hit occurs, the count value of the remaining LRU counters remaining unchanged when a cache hit occurs.

26. The computer system of claim 25 further comprising purging means, coupled to said prefetch cache, for purging said prefetch cache of a least recently used instruction when a cache miss occurs by writing said next instruction N+1 to the particular cache register corresponding to the LRU counter exhibiting a maximum count value.

27. The computer system of claim 26 further comprising second incrementing means, coupled to said LRU counters, for incrementing those LRU counters other than the LRU counter corresponding to said particular cache register into which said next instruction N+1 is written when a cache miss occurs.

28. The computer system of claim 21 wherein said processor cache comprises an internal processor cache integrated in said processor.

29. The computer system of claim 21 wherein said processor cache comprises an external processor cache externally coupled to said processor.

30. The computer system of claim 28 wherein said processor cache further comprises an external processor cache externally coupled to said processor.

31. In a computer system including a processor employing a processor cache, a method of accessing a main memory comprising:

providing said main memory with a main memory prefetch cache including a plurality of prefetch registers for storing a plurality of lines from main memory;

initiating a memory cycle to said main memory to retrieve a current line;

determining if a cache hit occurs in said prefetch cache for said current line during said memory cycle;

prefetching, if a cache hit occurs, said current line from said prefetch cache and then overwriting said current line in said prefetch cache with a next line from said main memory during said memory cycle;

determining the least recently used line in said prefetch cache, retrieving, if a cache miss occurs, said current line from said main memory, and storing during said memory cycle, if a cache miss occurs, a next line from main memory subsequent to said current line in the particular prefetch register occupied by said least recently used line.

32. In a computer system including a processor employing a processor cache, a method of accessing a main memory comprising:

providing a main memory prefetch cache situated in a memory controller and coupled to said main memory;

initiating a main memory cycle to retrieve a current line from said main memory;

determining, by said memory controller, if said current line is stored in said prefetch cache, and if said current line is determined to be stored in said prefetch cache, then retrieving said current line from said prefetch cache and providing said current line to said processor, and retrieving a next line form said main memory and overwriting said current line in said prefetch cache with said next line during said memory cycle, and if said current line is determined not to be stored in said prefetch cache, then retrieving said current line from said main memory and providing said current line to said processor, and retrieving said next line from said main memory and storing said next line in said prefetch cache during said memory cycle.

33. The method of claim 32 wherein said determining step further comprises modifying said main memory cycle to retrieve the next line from said main memory rather than said current line when in said determining step it is determined that the current line is stored in said prefetch cache.

34. The method of claim 32 wherein said prefetch cache includes X registers wherein X is a number, said method further comprising the steps of:

providing a respective least recently used (LRU) counter corresponding to each of the registers in said prefetch cache;

initializing each of said LRU counters at a unique predetermined count value between 0 and X inclusive;

if in said determining step said current line is determined to be stored in said prefetch cache as per a cache hit, then clearing a count value stored in the particular LRU counter corresponding to a register in said prefetch cache for which said cache hit occurred;

incrementing said LRU counters whose count values are less than the count value of said particular LRU counter prior to said clearing step;

if in said determining step said current line is determined not to be stored in said prefetch cache as per a cache miss, then storing said next line in a register in said prefetch cache corresponding to an LRU counter having a maximum count X, and incrementing the remaining counters.

35. A method for enhancing the processing of instructions stored in a main memory of a computer system, said computer system including a processor with a processor cache memory coupled thereto, a sequence of instructions being stored in said main memory which is controlled by a memory controller, said method comprising:

providing said main memory with a prefetch cache memory situated in said memory controller;

issuing a request, by said processor to said memory controller, for a current instruction N in said sequence of instructions stored in said main memory;

determining, by said memory controller, if said current instruction N is stored in said prefetch cache memory, and if said prefetch cache memory is determined to be storing said current instruction N, then retrieving said current instruction N from said prefetch cache memory and providing said current instruction N to said processor, and, during a same memory cycle, retrieving a next instruction N+1 from said main memory and overwriting said current instruction N in said prefetch cache memory with said next instruction N+1, or if said prefetch cache memory is determined not to contain said current instruction N, then retrieving said current instruction N from said main memory and providing said current instruction N to said processor and substantially concurrently retrieving a next instruction N+1 from said main memory and storing said next instruction N+1 in said prefetch cache memory.

36. The method of claim 35 wherein said determining step further comprises modifying said main memory cycle to retrieve the next instruction N+1 from said main memory rather than said current instruction N when in said determining step it is determined that the current instruction N is stored in said prefetch cache.

37. The method of claim 35 wherein said prefetch cache includes X registers wherein X is a number, said method further comprising the steps of:

providing a respective least recently used (LRU) counter corresponding to each of the registers in said prefetch cache;

initializing each of said LRU counters at a unique predetermined count value between 0 and X–1 inclusive;

if in said determining step said current instruction N is determined to be stored in said prefetch cache as per a cache hit, then clearing a count value stored in the particular LRU counter corresponding to a register in said prefetch cache for which said cache hit occurred;

incrementing said LRU counters whose count values are less than the count value of said particular LRU counter prior to said clearing step;

if in said determining step said current instruction N is determined not to be stored in said prefetch cache as per a cache miss, then storing said next instruction N+1 in a register in said prefetch cache corresponding to an LRU counter having a maximum count X, and incrementing the remaining counters.

38. A method for enhancing the processing of instructions stored in a main memory of a computer system, said computer system including a processor with a processor cache memory coupled thereto, a sequence of lines of code and data stored in said main memory which is controlled by a memory controller, said method comprising:

providing said main memory with a prefetch cache memory integrated within said memory controller and coupled to said main memory;

issuing a request, by said processor to said memory controller, for a particular line in said sequence of lines stored in said main memory, said particular line being designated a current line;

initiating a main memory cycle by said memory controller to retrieve said current line;

determining, by said memory controller, if said current line is stored in said prefetch cache memory, and if said prefetch cache memory is determined to be storing said current line, then retrieving said current line from said prefetch cache memory and providing said current line to said processor and said processor cache, and modifying the main memory request begun in said initiating step to retrieve a current line+1 from said main memory and overwriting said current line in said prefetch cache memory with said current line+1 during said main memory cycle, and if said prefetch cache memory is determined not to contain said current line, then continuing said main memory cycle to retrieve said current line from said main memory and providing said current line to said processor, and further continuing said main memory cycle to retrieve said current line+1 from said main memory and storing said current line+1 in said prefetch cache memory.

39. The method of claim 38 wherein said prefetch cache includes X registers wherein X is a number, said method further comprising the steps of:

providing a respective least recently used (LRU) counter corresponding to each of the registers in said prefetch cache;

initializing each of said LRU counters at a unique predetermined count value between 0 and X–1 inclusive;

if in said determining step said current line is determined to be stored in said prefetch cache thus signifying a cache hit, then clearing the count value stored in the particular LRU counter corresponding to the register in said prefetch cache for which said cache hit occurred;

incrementing said LRU counters whose count values are less than the count value of said particular LRU counter prior to said clearing step;

if in said determining step said current line is determined not to be stored in said prefetch cache as per a cache miss, then storing said current line+1 in the register in said prefetch cache corresponding to the LRU counter having a maximum count X, and incrementing the remaining counters.

\* \* \* \* \*